Patented Oct. 8, 1929

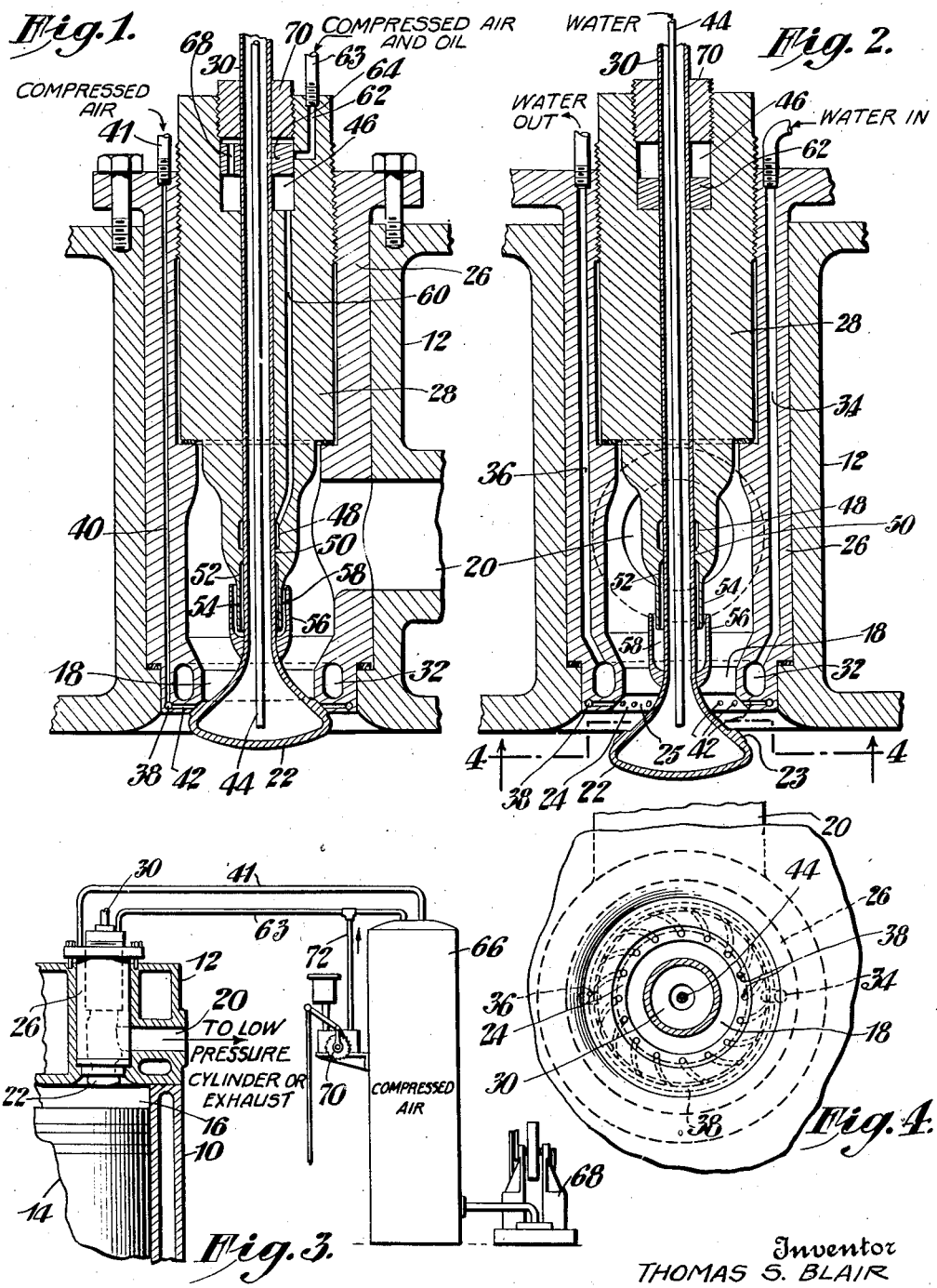

1,731,222

UNITED STATES PATENT OFFICE

THOMAS S. BLAIR, OF BROOKLYN, NEW YORK, ASSIGNOR TO DOHERTY RESEARCH COMPANY, OF NEW YORK, N. Y., A CORPORATION OF DELAWARE

FLUID-COOLED VALVE AND VALVE SEAT

Application filed March 24, 1927. Serial No. 177,889.

The present invention relates to valves and valve seats for handling high temperature fluids.

It has been proposed to use compound internal combustion engines having transfer valves controlling the flow of hot gases from the high to the low pressure cylinders. Owing to the high pressures used it is necessary to make metal valves and valve seats for controlling the high temperature gases of compound internal combustion engines. Owing to the high temperature conditions and to the oxygen which is always present in the gases to be handled, the transfer valves and seats are apt to scale. It is evident that the presence of a small particle of scale on the working face of the valve or valve seat will prevent the tight closing of the valve and thus defeat its purpose. It is evident also that deposits of carbon or other solid products of combustion or foreign matter may form on valves and valve seats of internal combustion engines under certain conditions and that said deposits will prevent the efficient functioning of the valves.

The primary object of the present invention is to provide a valve seat and valve capable of withstanding high temperatures.

A second object of the present invention is to provide a self-cleaning valve seat.

A third object of the present invention is to provide a valve seat adapted for simultaneously cooling and cleaning thereof.

A further object of the present invention is to provide a valve seat adapted to be cooled by both air and water.

It has been found also when operating transfer or like valves in highly heated gases that the valve stems seize and refuse to move. The seizing of the valve stems has been due apparently to the destruction of the oil lubricant used on the stems by the hot gases. Whether or not the action of the gases on the lubricant is the true reason for the seizing of the valve stems, it has been attempted to overcome the difficulty of seizing by providing more clearance around the stem of the valve. However, the clearance around the valve stem was gradually enlarged without preventing seizing until the gases blew out the oil film from around the valve stem. It was then necessary, of course, to desist from increasing the clearance around the valve stem.

It is a further object of the present invention to provide means for preventing the stems of high temperature valves from seizing.

The novel features of the present invention are pointed out with particularity in the appended claims. The invention itself, however, will best be understood from the following description taken in connection with the accompanying drawing in which—

Fig. 1 is a sectional view through a portion of the head of an internal combustion engine having therein a valve and seat according to the present invention.

Fig. 2 is a view similar to Fig. 1, but taken on a plane at right angles to that of Fig. 1 and showing the valve in open position.

Fig. 3 is a sectional view illustrating the valve of Figs. 1 and 2 in position in the cylinder head and illustrating the relative position of the parts of the engine, and the source of compressed air and oil.

Fig. 4 is a detail view taken on the line 4—4 of Fig. 2 looking in the direction of the arrows.

In the drawing, 10 is the high pressure cylinder of a compound internal combustion engine the low pressure cylinder of which is not illustrated. Said engine has also a head 12 forming with the cylinder 10 and the piston 14 a combustion chamber 16 from which, at suitable intervals, hot gases are to be transferred to another cylinder acting at lower pressure than cylinder 10 or from which the gases may be exhausted to atmosphere if desired. The gases leave the chamber 16 through a port 18 and a passage 20. During combustion in the space or chamber 16 communication between the chamber 16 and the port 18 is cut off by a valve 22 cooperating with a valve seat 24, the seat 24 forming part of a sleeve 26 set into and fastened in the head 12. Threaded into the sleeve 26 is a guide 28 within which is slidably mounted the stem 30 of the valve 22.

Although it is assumed that the valve 22 and the seat 24 are made of metals capable of resisting relatively high temperatures it has often been found necessary to cool either the valve or the seat or both to prevent scaling at their contact surfaces. One means of cooling the seat 24 as illustrated comprises an annular chamber 32 formed within the inner or lower end of the sleeve 26 and adjacent the seat 24. A duct 34 is provided in the sleeve 26 connecting the chamber 32 with the outer surface of the sleeve and through which water or other cooling fluid may be introduced into the chamber 32. A second duct 36 is also preferably provided in the sleeve 26 connecting the chamber 32 with the exterior surface of sleeve 26 and through which fluid used to cool walls of chamber 32 may escape.

Under certain conditions, water cooling of the valve seat may be omitted and under other conditions it may be desired to supplement the cooling action of a chamber of the character of chamber 32. When it is desired either to omit the chamber 32 or to supplement its action, it is preferred to provide an annular channel 38 in the seat 24 and to introduce air into the channel 38. A duct 40 connecting the channel 38 with the outer surface of sleeve 26 may be used for introducing air or other gaseous fluid into the channel 38. The seat 24 has a bevelled contact face 25 designed to contact with the bevelled contact face 23 of a raised shoulder on the valve 22. When the valve is closed, surfaces 23 and 25 are in close contact to prevent the passage of gas through the valve. It is preferred to discharge air or other cooling gaseous fluid which has been introduced into the conduit 38 at the contact face 25. For this purpose conduit 38 is connected with the surface 25 by a plurality of small holes 42. Air, or like fluid, being supplied to conduit 38 under pressure as soon as valve 23 begins to open, a flow of air is established through the conduit 40, conduit 38 and holes 42. The flow of air through holes 42 and the connecting conduits not only cools the seat 24, but also blows against the surface of valve 22 to cool the valve. Furthermore, when the valve 22 is closed to the seat, either on the opening or closing movement of the valve, the contact faces 23 and 25 are separated by so small a space that the air escapes from between the contact surfaces with a scouring action which carries away any scale, carbon or other solid, which may have collected on the contact surfaces.

The cool fluid passing through holes 42 not only reduces scaling by cooling the metal of the valve seat 24 and removes scale or dirt from the surface 25, but also reduces scaling of surface 25 of the valve seat by mixing with and cooling the gases passing over the valve seat.

Whether or not the valve seat is cooled by one or two means as previously described it is sometimes desired to cool the valve itself. For this purpose, it is preferred to make the valve 22 on stem 30 hollow and to run a duct 44 for cooling fluid down through the center of the hollow stem 30. The conduit 44 will be understood to be fixed whereas the valve stem 30 must necessarily reciprocate and a trombone connection (not shown) is preferably provided between the outer end of the stem 30 and a conduit for carrying away water from stem 30. The inside diameter of the hollow stem 30 is enough larger than the outside diameter of conduit 44 to permit fluid which has passed through the conduit 44 into the valve proper to escape between the conduit and the inner face of stem 30. It is evident that the duct 44 discharges cooling fluid immediately above the inner surface of valve 22 and at the center of said surface. The inner surface of valve 22 is shaped in a smooth curve from the central axis of the valve to its edges so that the cooling fluid distributes itself over said surface evenly with stream-line flow whereby the valve is cooled as uniformly as possible by the fluid from duct 44. Water or other fluid passing through valve 22, by cooling the valve, helps to prevent scale and other foreign matter from collecting on its contact surface 23.

When the gas controlled by the valve 22 has sufficient temperature and pressure to cause the stem 30 to seize, special means are provided according to the present invention to overcome the difficulty. For this purpose, the valve head 28 is provided with two chambers 46 and 48 through which the stem 30 passes. Chamber 46 is near the outer end of plug 28 while chamber 48 is near the inner end of the plug and relatively adjacent the valve 22.

Intermediate the chambers 46 and 48 the valve stem 30 has guiding contact with the inner surface of the guide 28. Said head is drilled out to receive the valve stem and the passage in the head for the valve stem intermediate chambers 46 and 48 has an inside diameter approximately .001 inch larger than the outside diameter of the stem 30. The chambers 46 and 48 form part of the means according to the present invention for preventing seizing of the spindle 30 when high temperature gases are passing through the port 18 and the passage 20. For this purpose, a cooling fluid under pressure is passed into the chamber 48. The valve head and stem are so constructed and arranged that the cooling fluid passes from the chamber 48 in a thin film or stream along the surface of the stem 30 in the direction toward the valve 22. At the side of the chamber 48 toward the valve 20, the guide 28 approaches the stem 30 quite closely along a surface 50, the clearance between the head and the stem along surface 50 being preferably about .002 of an inch and thereby affording a restricted passageway for the escape of air, or other cooling fluid from the chamber 48. On the side of the surface 50 toward the valve 22, moreover, the guide 28 is counterbored to provide a recess 52 affording a relatively large passage for the air which has escaped from chamber 48 along surface 50. It will be observed that the recess 52 has a mouth opening at the end of the head 28 toward the valve 22. It is preferred moreover, to increase the path of the air which has passed along the surface of the stem 30 from chamber 48 into recess 52. For this purpose, the end of the guide 28 toward valve 22 and inclosing a portion of the recess 52 is reduced in outside diameter as indicated at 54. Moreover, a cup 56 is fixed to the stem 30 intermediate valve 22 and the reduced portion 54. Cup 56 has a mouth opening in the direction opposite that of the recess 52, and the inside diameter of the cup 56 is sufficiently larger than the outside diameter of the reduced portion 54 to provide a passage 58 connecting with the mouth of the recess 54 and acting to increase the length of the path of the air from chamber 48 before it escapes into the gases which have passed through port 18. It will be seen therefore that air passing from chamber 48 through the recess 52 and passage 58 not only serves to cool the surface of the stem 30, but also prevents hot gases from working their way along between the stem 30 and the guide 28 and thereby carbonizing the oil intended for lubricating the stem 30. Cooling fluid, preferably air under pressure, is introduced into chamber 46 through a duct 62 in the upper or outer end of head 28, and from chamber 46 into chamber 48 preferably by means of a duct 60 also running through guide 28. Preferably, means are provided for cutting off the air supply to chamber 46 except when valve 22 is open and hot gases are passing through port 18. Unnecessary use of air or other cooling fluid is thereby prevented. For this purpose, there is illustrated in the drawing a piston valve 64. Valve 64 is fixed to stem 30 and makes a sliding fit with the inner face of chamber 46. Valve 64 is so placed on stem 30 that it closes the inner end of duct 62 when valve 22 is closed.

When valve 22 opens, piston valve 64 is moved by stem 30 to uncover the end of duct 62. Air or other fluid may then pass into chamber 62 on one side of piston valve 64, pass through the aperture 68 in said piston to the other side of the piston and then pass out of chamber 46 through duct 60 formed in guide 28. Duct 60 delivers fluid from chamber 46 to chamber 48. It will be observed that as illustrated, one side of chamber 46 is formed by a plug 70 screwed into guide 28, it being a convenient way of forming chamber 46 to counterbore the hole for spindle 30 in guide 28.

It is preferred according to the present invention to apply lubricant to the stem 30 by introducing oil into the air or other fluid entering chamber 46 through duct 62. Means for introducing lubricant into a fluid stream are well known and are not disclosed in detail herein.

It is preferred that the air or other fluid entering duct 40 be taken from the same source as the fluid entering duct 62. It is preferred also that fluid entering ducts 40 and 62 be at a pressure approximately five pounds above the maximum pressure in passage 20 at the times valve 22 is open.

It is one of the advantages of the present invention that under given temperature conditions it permits the use of less than the average clearance between the valve stem and the guiding surfaces for the stem. The valve is thereby guided to its seat more accurately, since increasing stem clearance increases the inaccuracy with which the valve seats. For instance, if stem 30 is of ¾" diameter, the clearance between stem 30 and the guide surfaces in guide 28 need be only .00075" in a valve arrangement according to the present invention.

The air supply for ducts 40 and 62 previously described may be taken conveniently from an apparatus for this such as is illustrated in Fig. 3. In Fig. 3 the ducts 40 and 62 are extended by pipes 41 and 63 respectively to a pressure tank 66. Tank 66 is supplied by a suitable compressor 68 which is illustrated as being of the belt driven type. Oil may be supplied to pipe 63 by a force feed device 70 of known type. Oil from device 70 passes through pipe 72 and into pipe 63. Oil which has been introduced into pipe 63 flows to duct 62 along with air from tank 66 to lubricate parts 30 and 64.

While valve 22 has been described as a transfer valve, it is evident that the present invention is applicable to other than transfer valves, it being especially useful whenever valves are employed to control gases at high temperature.

While I have illustrated in the drawing and described in the foregoing matter, a specific form of the present invention, it will be understood that the present invention is not limited to details of arrangement, form or operation herein disclosed except in so far as such details are positively and clearly included in the appended claims.

Having thus described my invention, I claim:

1. In combination, a valve and a valve seat therefor, and means for delivering an air blast between the contact surfaces of said valve and seat.

2. In combination, a valve and a valve seat therefor, said valve and seat having contact surfaces, said seat having a gas conduit therein and having apertures running from said conduit to its contact surface, and means for delivering gas under pressure to said conduit.

3. In combination, a valve and a valve seat therefor, said valve and seat having contact surfaces, said seat containing an annular chamber, means for passing cooling liquid into and out of said chamber, and means for delivering a cooling and cleaning gas through said seat and to its contact surface.

4. In combination, a valve guide, a valve having a stem mounted in and having contact within said guide, said guide having a chamber and an open mouthed recess surrounding said stem intermediate said guiding contact and said valve, and means whereby gas may be forced between said stem and said open mouthed recess.

5. In combination a valve guide, a valve having a stem mounted in and having contact within said guide over its upper portion and clearance with said guide over its lower portion, and means whereby gas may be forced through said clearance.

6. In combination, a valve guide, a valve having a stem mounted in and having contact within said guide over its upper portion and clearance with said guide over its lower portion about which said guide has a reduced portion, a cup fixed to said stem and surrounding said reduced portion, and means whereby gas may be forced through said clearance space into said cup and out of said cup between said cup and said reduced portion.

7. In combination, a valve having a stem, means for guiding said stem and means for forcing a current of gas containing lubricant along the outer surface of said stem.

8. In combination, a valve, a seat for said valve, and means for forcing cooling fluid containing oil along the outer surface of said stem during periods when said valve is off its seat.

9. In combination, a valve guide, a valve having a stem mounted in and having guiding contact with said head, said guide having a chamber and an open-mouthed recess surrounding said stem intermediate said guiding contact and the valve, said guide forming also a restricted passage along the surface of said stem and connecting said chamber and recess, and means whereby gas under pressure is admitted to said chamber when said valve is open.

10. In combination, a valve guide, a valve having a stem mounted in and having a guiding contact with said guide, said guide having a reduced portion surrounding said stem at a point relatively adjacent said valve, a cup fixed to said stem and surrounding said reduced portion, and means whereby gas may be forced between said stem and said reduced portion into said cup and out of said cup between the cup and said reduced portion.

11. In combination, a valve guide, a valve having a stem mounted in and having guiding contact with said guide, said guide having a chamber and an open-mouthed recess surrounding said stem intermediate said guiding contact and said valve, the portion of said guide within said recess being of reduced outside diameter, a cup on said stem surrounding said reduced portion and having a mouth opening in the opposite direction from said recess, said guide having also a restricted passage along the outer surface of said stem connecting said chamber and said recess, and means whereby gas under pressure is admitted to said chamber when said valve is open.

12. The combination of a valve and a stem therefor, a guide in which said stem is mounted, said guide having a chamber therein and having a duct for the introduction of pressure fluid to said chamber, means whereby fluid from said chamber passes along the outer surface of said stem to prevent seizing of the stem in said guide, and a valve fixed to said stem for cutting off said duct from said chamber when said valve is seated.

In testimony whereof I affix my signature.

THOMAS S. BLAIR.